US000001159H

United States Statutory Invention Registration [19]

[11] Reg. Number: H1159

Roach

[43] Published: Apr. 6, 1993

[54] PORTABLE PNEUMATIC AIRCRAFT FUEL TANK AIR EDUCTOR

[75] Inventor: Charles C. Roach, Midlothian, Tex.

[73] Assignee: The United States of America as represented by the Secretary of the Navy, Washington, D.C.

[21] Appl. No.: 710,196

[22] Filed: Jun. 3, 1991

Related U.S. Application Data

[63] Continuation-in-part of Ser. No. 534,988, Jun. 8, 1990, abandoned.

[51] Int. Cl.[5] ..... F04F 5/00

[52] U.S. Cl. ..... 417/151; 417/172

[58] Field of Search ..... 417/151, 158, 172, 178, 417/183, 196, 198; 98/42.05, 115.1

[56] References Cited

U.S. PATENT DOCUMENTS

| | | | |
|---|---|---|---|
| 1,233,941 | 7/1917 | Welsh | 417/151 |
| 2,350,401 | 6/1944 | Kneass, Jr. | 417/172 |
| 3,625,820 | 12/1971 | Gluntz et al. | 417/196 |
| 4,134,547 | 1/1979 | Gamst | 417/196 |
| 4,940,392 | 7/1990 | Adkins | 417/196 |
| 5,024,583 | 6/1991 | Sasaki et al. | 417/198 |

FOREIGN PATENT DOCUMENTS

| | | | |
|---|---|---|---|
| 3836661 | 4/1990 | Fed. Rep. of Germany | 417/151 |
| 0208124 | 3/1990 | Switzerland | 417/151 |

*Primary Examiner*—David H. Brown

*Attorney, Agent, or Firm*—John D. Lewis; Kenneth E. Walden

[57] ABSTRACT

A spark-free portable air eductor for purging fumes from aircraft fuel tanks that have contained a low vapor pressure liquid. A conical tube passes through an access opening in the tank to be purged. The conical tube has its larger diameter opening residing within the tank and its smaller diameter residing outside the tank. A jet introduces a low pressure air flow into the conical tube along its longitudinal axis. The jet is located at the smaller diameter opening of the conical tube. A cylindrical tube is connected to the smaller diameter opening of the conical tube. As low pressure air exits the jet, a vacuum is created at the larger diameter opening of the conical tube thereby causing a large volume of air to pass through the tank, thus purging an aircraft fuel tank without use of electric power. The large volume of air moving through the tank reduces the time required for the tank to be purged of all fumes.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PORTABLE PNEUMATIC AIRCRAFT FUEL TANK AIR EDUCTOR

ORIGIN OF THE INVENTION

The invention described herein was made in the performance of official duties by an employee of the Department of the Navy and may be manufactured, used, licensed by or for the Government for any governmental purpose without payment of any royalties thereon.

The following specification is related to the portable air eductor disclosed in applicant's prior co-pending application, Ser. No. 534,988, filed Jun. 8, 1990, now abandoned, with respect to which the present application is a continuation-in-part.

FIELD OF THE INVENTION

This invention relates to air eductors and in particular to a portable air eductor for purging fumes from aircraft fuel tanks that have contained a low vapor pressure liquid. The device is a pneumatic apparatus that can be used in aircraft maintenance spaces requiring spark free operation.

DESCRIPTION OF THE PRIOR ART

In the aerospace industry, it is necessary to perform preventive maintenance checks on fuel tanks. However, before these checks can be made, the tanks must be drained of all excess fuel and completely purged of all remaining explosive fumes. The problem is that jet fuels such as JP-5 have a very low vapor pressure and therefore do not readily evaporate. Aircraft maintenance spaces, especially when the aircraft fuel tanks are open, must be maintained as a spark free environment. This limits purging to evaporation or to methods operated solely with the hangar deck air sources. This is especially critical in shipboard maintenance when use of any electrical power equipment or extension cords are proscribed. Consequently, successful and complete purging of the tanks through evaporation takes days.

Conventional pump systems are available to speed the process of evaporation. However, some conventional systems require boilers and condensers. Other systems require holding tanks and use complex baffle systems in the pumping process. Most employ electrical operation and cannot be used in aircraft spark free maintenance spaces. Unfortunately, these complex systems are also expensive, thereby adding to the cost of overall tank maintenance.

SUMMARY OF THE INVENTION

Accordingly, it is an object of the present invention to provide an air eductor that will completely purge an emptied fuel tank of explosive fumes more quickly than natural evaporation without using electrical power or other combustion causing methods.

It is a further object of the present invention to provide an air eductor that is portable and easy to use.

It is still a further object to teach an aircraft air eductor that operates from the hangar deck air supply and can be used in a spark free environment.

A further object of the present invention is to provide an air eductor that is of simple and inexpensive construction.

Other objects and advantages of the present invention will become more apparent hereinafter in the specification and drawings.

In accordance with the present invention, a portable air eductor has been designed for purging fumes from aircraft fuel tanks that have contained a low vapor pressure liquid. A conical tube is connected to a mounting plate. The plate is mounted into an access opening of the tank to be purged such that the conical tube's larger diameter opening resides in the tank and smaller diameter opening resides outside the tank. An air line is inserted through the conical tube and attached to a jet used to introduce air under pressure into the conical tube. The jet faces away from the tank to be purged and is located at the conical tube's smaller diameter opening and along the conical tube's longitudinal axis. A cylindrical tube sharing the longitudinal axis of the conical tube is connected to the smaller diameter opening of the conical tube. As compressed air exits the opening of the jet, energy is imparted to the larger mass of air in the throat of the venturi created by the conical tube. Thus, a large volume of air is drawn from the tank to be purged thereby reducing the amount of time required to purge the tank. A standard air fitting is used allowing the device to be operated from the standard high pressure air source located in most hangar bays, maintenance spaces and aircraft carriers.

DETAILED DESCRIPTION OF THE INVENTION

Figure 1:
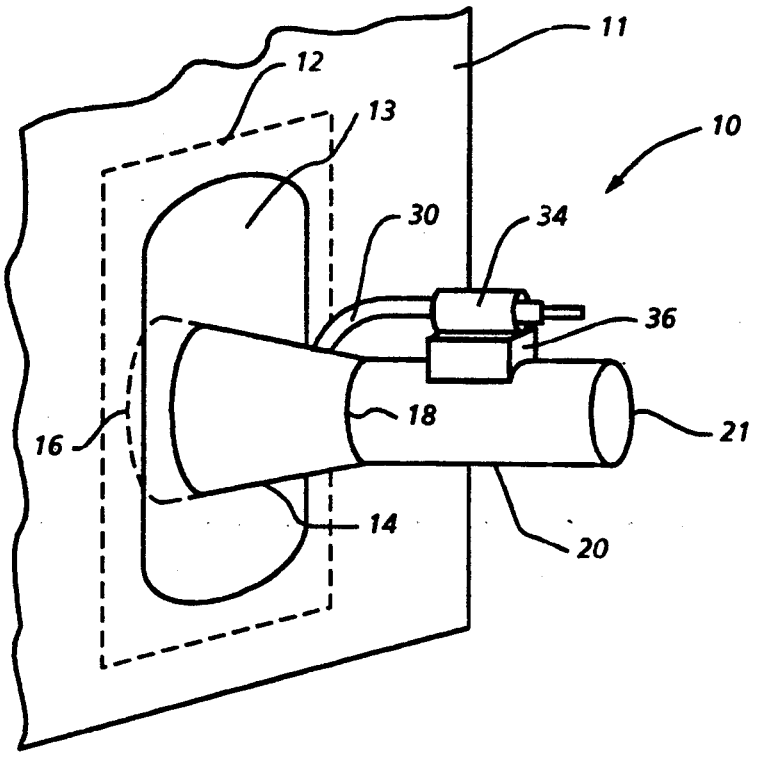
FIG. 1 is a perspective view of the portable air eductor according to the present invention.

Referring now to the drawings, and in particular to FIG. 1, the portable air eductor 10 according to the present invention is shown. A conical tube 14 is inserted through and connected to a mounting plate 12. Connection may be made by welding since both conical tube 14 and mounting plate 12 are typically made of metal. Mounting plate 12 is used to mount air eductor 10 into an access opening 13 of a fuel tank 11 to be purged. Generally, a fuel tank has at least two access openings. In operation, the access openings are covered by access panels (not shown) which are mounted from the interior of the tank since forces exerted on the access panels are from the interior of the tank. The internal mounting method is used to distribute the forces throughout the panel structure instead of to the heads of the screws securing the panel. Accordingly, mounting plate 12 used in the present invention is mounted from the inside of tank 11 utilizing the same mounting hardware that keeps the tank's access panels in place during normal operation. The prototype device was constructed and tested on the Navy's A6 Intruder aircraft. The bolt patterns were designed to fit the bolt patterns on the A6, but it should be understood that the bolt patterns may be changed so that the device will be smoothly adaptable to any military or civilian aircraft fuel tank.

Conical tube 14 has a larger diameter opening 16 and a smaller diameter opening 18. Conical tube 14 is connected forward of its larger diameter opening 16 to plate 12 in order to insure that the larger diameter opening 16 is free and unencumbered within tank 11. Outside of tank 11, conical tube 14 narrows to a smaller diameter opening 18 which is connected to one end of a cylindrical tube 20. The other end 21 of tube 20 is open to ambient air.

Cylindrical tube 20 is typically three times as long as its inside diameter. This provides the best compromise between maximum acceleration and skin-induced turbulence along the inside of tube 20. Furthermore, the inside diameter of tube 20 should not exceed two inches. Therefore, a cylindrical tube 20 operatively sized to have an inside diameter of 2 inches or less and a length approximately 3 times its inside diameter is considered the best mode to practice the invention. The size of conical tube 14 is constrained only by the aforementioned criteria for tube 20 and practical construction considerations which will be discussed further hereinbelow.

Figure 2:
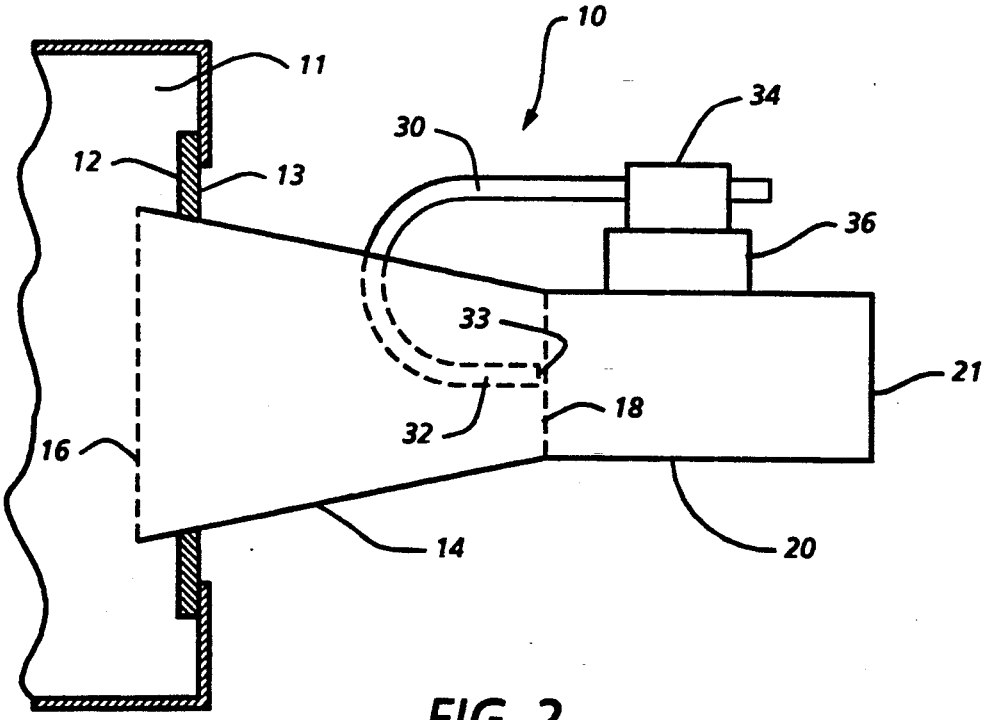
FIG. 2 is a cross-sectional view showing the placement of the jet with respect to the conical and cylindrical tubes.

An air line 30, used to transport air under pressure from an air pressure source such as hangar deck air (not shown), is terminated on one end by a jet 32 as shown in FIG. 2. Compressed air in the range of 100–200 psi is used for safety reasons and because sources generating this range of pressures are readily found in the vast majority of maintenance shops. For example, 100 psi hangar deck air is standard in all Navy aircraft hangars, hangar bays, rework facilities, and maintenance spaces. Jet 32 is situated along the longitudinal axis shared by both conical tube 14 and cylindrical tube 20. Jet 32 points in a direction of flow from the larger diameter opening 16 to the smaller diameter opening 18. The opening 33 of jet 32 resides within conical tube 14 just at the smaller diameter opening 18. Air line 30 terminates on its other end with a quick disconnect air pressure valve 34. Quick disconnect valve 34 is securely mounted on top of cylindrical tube 20 via valve mounting bracket 36.

Opening 33 of jet 32 should be between 1/12 and 1/15 of the inside diameter of tube 20. The length of conical tube 14 should be long enough to attach mounting plate 12 between the larger diameter and smaller diameter openings 16 and 18, respectively, and still have enough room so that air line 30 will not have to pass through mounting plate 12.

In operation, the aircraft fuel tank air eductor 10 is mounted in an access opening 13 of tank 11 to be purged of fumes. Tank 11 is shown only in section and has a second access opening (not shown) to facilitate the large volume of air movement required for the air eductor 10 to function. A second or multiple access openings are standard in aircraft fuel tanks of most aircraft. The mounting plate 12 is fitted into the access opening 13 in tank 11 and secured to the interior of tank 11 using any conventional mounting hardware. A near air-tight seal between tank 11 and mounting plate 12 is desired. An air pressure source (not shown) is connected to quick disconnect valve 34 to supply air under pressure through air line 30 to jet 32. As the air exits opening 33 of jet 32, a vacuum is created at the larger diameter opening 18. The vacuum draws a continuous large volume of air from tank 11 through conical tube 14 and cylindrical tube 20. The fast moving air exiting the opening 33 of jet 32 at the throat of the venturi created by conical tube 14 rapidly purges the tank. The air exiting jet 32 dissipates high velocity energy into the mass air surrounding jet 32 resulting in movement of the whole mass through cylindrical tube 20. This continuous flow of air reduces the amount of time required to purge tank 11 of all fumes.

The advantages of the present invention are numerous. A tank that had been filled with a low vapor pressure liquid, such as jet fuel JP-5, traditionally took days to be purged of all fumes through natural evaporation. In contrast, a large volume of air flowing through access openings of a fuel tank initiated by the air eductor of the present invention reduces purging time to a matter of hours. Furthermore, the portable design of the present invention provides great utility in the typical fuel tank maintenance environment. It is easily adaptable to any number of different tanks by merely changing the mounting plate, it is spark free, and uses only the maintenance space's air supply, and thus can be used under spark-free conditions.

Another advantage of the present invention is that it only requires a relatively low pressure air source. The air pressure source should be capable of developing air pressure in the range of 100–200 psi. Such pressures are readily available in any machine shop where preventive maintenance would take place and in most, if not all, hangar maintenance spaces where aircraft maintenance is conducted. Thus, there are no special equipment requirements thereby making the present invention simple to operate and cost effective. More importantly, use of low pressure air provides a safer environment for maintenance personnel. Higher pressure could potentially cause hearing damage because of increased noise levels, eye injuries from flying particles and physical reaction injuries from someone unexpectedly encountering high velocity exhaust air.

Thus, although the invention has been described relative to specific embodiments thereof, it is not so limited and numerous variations and modifications thereof will be readily apparent to those skilled in the art in light of the above teaching. It is therefore to be understood that within the scope of the appended claims the invention may be practiced otherwise than as specifically described.

What is claimed is:

1. A spark-free portable air eductor for purging fumes from aircraft fuel tanks that have contained a low vapor pressure fuel comprising:

a conical tube having a larger diameter opening and a smaller diameter opening, said larger diameter opening residing within the fuel tank to be purged and said smaller diameter opening residing outside the fuel tank whereby said conical tube passes through an access opening in the aircraft fuel tank;

a mounting plate connected to said conical tube forward of said larger diameter opening wherein said mounting plate is further attached at the access opening whereby an airtight seal is formed between said mounting plate and the aircraft fuel tank to be purged;

a jet located at the point of said smaller diameter opening for introducing air under pressure in the range of 100–200 PSI thereat, said jet having its opening residing along a longitudinal axis of said conical tube with said opening pointing in a direction substantially 180° away from the fuel tank;

a means for transporting said air under pressure inserted through said conical tube and connected to said jet;

a quick disconnect valve for connecting an air line supplying said air under pressure to said means for transporting; and a cylindrical tube sharing said longitudinal axis of said conical tube and connected to said conical tube operatively sized with an inside diameter two inches or less and a length approximately three times said inside diameter.

2. A spark-free portable air eductor according to claim 1 wherein said mounting plate is operatively sized with appropriate bolt holes to attach to the Navy's A6 Intruder fuel tanks.

3. A spark-free portable air eductor according to claim 1 wherein said cylindrical tube is operatively sized so that said jet inside diameter is approximately 1/12 to 1/15 the size of said cylindrical tube inside diameter.

* * * * *